June 7, 1966  D. R. STICKELL  3,254,865
CABLE CLAMP FOR SWITCH BOXES
Filed Sept. 24, 1964

INVENTOR.
D. Ross Stickell
BY
Webb, Burden, Robinson & Webb
HIS ATTORNEYS 3,254,865
CABLE CLAMP FOR SWITCH BOXES
Daniel Ross Stickell, 328 Grant St.,
Sewickley, Pa. 15143
Filed Sept. 24, 1964, Ser. No. 398,955
2 Claims. (Cl. 248—56)

This invention relates to an improvement in wire outlets and relates, in particular, to a new wire clamp for anchoring electrical wire or cable to electrical boxes.

When wiring buildings with insulated electrical wire, it is always necessary to conduct the ends of numerous wires or cables into electrical outlet boxes such as switch boxes, fuse boxes, etc. Such boxes are provided with openings or ports through which the insulated wire or cable is threaded. Building codes and construction regulations require that the wire or cable be anchored to the electrical boxes in which it is wired or spliced in such a manner that any tension or pull applied to the wire outside the box will be resisted by the box rather than the wired or spliced connections.

It is presently customary to provide cable attachement or anchoring means within the electrical box; however, the use of such means is awkward and inconvenient due to the confined space within such boxes.

I have devised an attachement means that is applied externally of the electrical outlet box. My device is particularly easy and convenient to install but effectively anchors the wire or cable to the box. My clamp eliminates the necessity of employing attachment means within the restricted confines of the outlet box.

I have shown the present preferred embodiment of my invention in the accompanying drawings in which.

Figure 1:
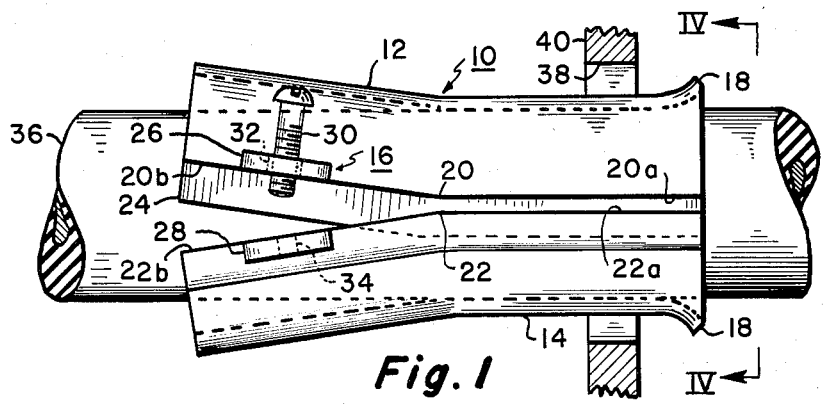
FIGURE 1 is a side elevation view of a clamp which embodies the features of the present invention, shown as positioned around a cable and partially extending through the port of an electrical box.

Referring to the drawings, the present apparatus comprises a generally tubular-shaped clamp 10 formed from two adjoining semi-tubular shaped segments 12 and 14 that are held together by clamp members 16. Each segment 12 and 14 has an outwardly extending semicircular flange 18 at one end so that the generally tubular-shaped clamp 10 is flanged at one end. Additionally, segments 12 and 14 are not straight, but each is inclined outwardly from the central axis of the generally tubular member 10. The abutting edges 20a, 22a, 20b and 22b of segments 12 and 14 manifest such inclination at adjacent pivot points 20 and 22. Segments 12 and 14 may be pivotally positioned or "rocked" in respect to one another about adjacent pivot points 20 and 22 so that the edges 20a and 22a of the segments adjacent flanges 18 may be brought together (FIGURE 1) and reduce the diameter of tubular clamp 10 at flanges 18. When the edges 20b and 22b are pivotally brought together (FIGURE 2), edges 20a and 22a separate and the diameter of tubular clamp 10 expands at flanges 18.

Figures 3, 4:
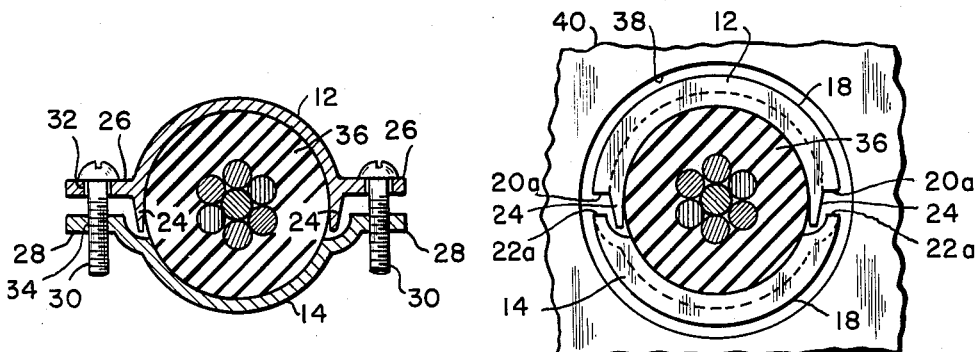
FIGURES 3 is a cross-sectional view of the clamp of FIGURES 1 and 2 as seen along the lines III—III of FIGURE 2.
FIGURE 4 is an end view of the clamp of FIGURES 1 and 2 as seen along the lines IV—IV of FIGURE 1.

Depending tapered lips 24 of segment 12 extend within the upwardly extending edges of segment 14 when the adjacent edges (20a and 22a or 20b and 22b) of segments 12 and 14 are brought together so that the segments are keyed to one another (see FIGURES 3 and 4).

Attachment means 16 are each composed of tabs 26 that extend laterally from segment 12 and adjacent tabs 28 that extend laterally from segment 14. Bolts 30 are extended through openings 32 of tabs 26 and may be threadedly engaged with the threaded openings 34 within tabs 28 (see FIGURES 1–3).

Figure 2:
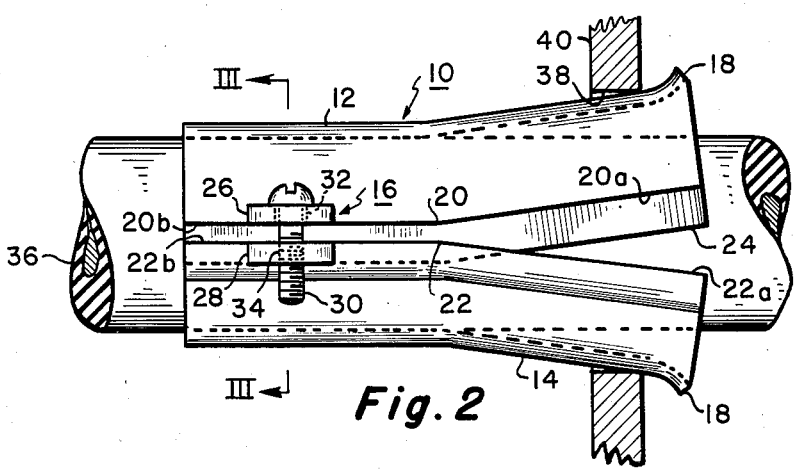
FIGURE 2 is a side elevation view as in FIGURE 1 except the clamp is shown as clamped to the cable and anchored within the port of the box.

Utilization of my device is demonstrated by FIGURES 1 and 2. In FIGURE 1, bolts 30 are disengaged from the threaded openings 34 of tabs 28 and the segments 12 and 14 are positioned on either side of a cable 36. Edges 20a and 22a are pivotally brought together reducing the diameter of tubular clamp 10 at flange 18. The flange 18 of tubular clamp 10 projects through port 38 into electrical box 40 (only a fragment of which is shown). This is possible because the diameter of port 38 is greater than that of flange 18 when the edges 20a and 22a of segments 12 and 14 are brought together and flanges 18 of the segments may be inserted through the port on either side of cable 36.

In FIGURE 2, bolts 30 are threadedly engaged with the threaded perforations 34 of tabs 28. Tabs 28 and 26 are drawn together by bolts 30 so that edges 20b and 22b are pivotally drawn together about pivots 20 and 22 and edges 20a and 22a are separated and the diameter of tubular clamp 10 is expanded at flanges 18. Port 38 is of a lesser diameter than tubular clamp 10 at flanges 18 when the flanges are expanded as shown by FIGURE 2, so that the tubular clamp 10 is held within port 30 of box 40 by its expanded flanges. Since tabs 28 and 26 are brought together by bolts 30, edges 20b and 22b, and segments 12 and 14 are drawn together tightly about cable 36 so as to clamp the tubular clamp 10 to the cable. Tension or pull on cable outside box 40 will be transmitted to box 40 through tubular clamp 10.

A central feature of the present invention is that at least one of the adjacent edges 20a, 22a, 20b or 22b of segments 12 and 14 taper outwardly in respect to the central axis of the generally tubular-shaped clamp 10. In this manner, the diameter of one end of tubular clamp 10 may be expanded or contracted.

While I have described the presently preferred embodiments of my invention, it is to be understood that it may be otherwise embodied within the scope of the following claims.

I claim:
1. A clamp for securing an electric cable to an electrical box having an opening into which said cable has been inserted, said clamp comprising:
  A. two opposed semi-cylindrical members having radii such that the members will encase the cable inserted into an opening, said members also having
    (1) longitudinally extending edges,
    (2) at least one of said edges being tapered towards at least one of the ends of the member from a point adjacent the center of said edges, so that when the members surround the cable and the edges of the members engage each other at said point only one pair of opposed ends of said members engage each other, and (3) radially extending semi-circular flanges on one pair of opposed ends of said members having such outer radii that when the ends of the members having such flanges are together the flanges may be inserted into said box opening, and B. means adjacent the ends of the members away from the flanges for securing said ends against each other whereby said flanges on the opposite ends are spaced from each other and engage the edges of the box opening into which the cable has been inserted.

2. A clamp for securing an electric cable to an electric box as set forth in claim 1 wherein each longitudinal edge of one said semi-cylindrical member is formed with an extending portion of lesser gauge than the balance of said member and the other said semi-cylindrical member having edges formed with grooves that are disposed to receive said extending portion so that when said semi-cylindrical members are brought together to encase said cable said members are keyed together.

References Cited by the Examiner

UNITED STATES PATENTS

| | | | |
|---|---|---|---|
| 1,821,294 | 9/1931 | Dieter | 248—56 |
| 1,821,295 | 9/1931 | Dieter | 248—56 |
| 2,825,748 | 3/1958 | Gray | 248—27 X |

CLAUDE A. LE ROY, *Primary Examiner.*